Patented June 12, 1945

2,377,867

UNITED STATES PATENT OFFICE 2,377,867

CONDENSATION PRODUCTS

Gaetano F. D'Alelio, Pittsfield, Mass., assignor to General Electric Company, a corporation of New York No Drawing. Application October 26, 1940, Serial No. 363,035

24 Claims. (Cl. 260—39)

This invention relates to the production of new materials, specifically condensation products, having valuable and characteristic properties that make them especially suitable for use in industry, for example in casting, molding, coating and adhesive applications, and for other purposes. The invention is concerned more particularly with compositions of matter comprising heat-convertible (heat-curable) aminoplasts modified with sulfamic acid ($NH_2SO_3H$), which also may be named sulfaminic acid, sulfamidic acid or amidosulfonic acid.

The present invention is based on my discovery that thermosetting aminoplasts can be prepared by effecting reaction between ingredients comprising an amino (including imino) or amido (including imido) compound, e. g., aminotriazines, urea, thiourea, dicyandiamide, etc. (or suitable mixtures thereof), an aldehyde, e. g., formaldehyde, and sulfamic acid.

Sulfamic acid is an amphoteric substance that contains a basic —$NH_2$ group and an acidic —$SO_3H$ group. As an amphoteric substance, pure sulfamic acid exerts a neutral reaction in water since the basicity of the —$NH_2$ group is neutralized by the acidity of the —$SO_3H$ group. The —$NH_2$ group of the sulfamic acid is aldehyde-reactable and directly or indirectly may intercondense with compounds containing the grouping

for example urea, aminotriazines, etc.

My invention provides potentially reactive (heat-convertible) aminoplasts and molding compositions that require no additional curing accelerator of the admixed-catalyst type, or other curing reactant, in order to obtain technically useful products. Such aminoplasts may be termed "self-curing aminoplasts." It was quite surprising and unexpected that such a neutral compound as sulfamic acid could be intercondensed with other components of an aminoplast to impart accelerated curing characteristics thereto, particularly in view of the fact that it has generally been believed heretofore that only acids or substances evolving acids at molding temperatures would accelerate the curing of a heat-curable aminoplast.

As is well known, aminoplasts are synthetic resins derived from amino (including imino) or amido (including imido) compounds, a typical example being urea-formaldehyde resin (reference: Modern Plastics, vol. 17, No. 2, October, 1939, page 433; Patent No. 2,214,851, D'Alelio).

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been entirely satisfactory.

In the heat-convertible resinous condensation products of this invention the curing property of the product is imparted thereto by creating a resin molecule having this inherent characteristic. Such resins may be said to be "self-curing" under heat, since the whole resin molecule including the curing reactanct that is an integral part thereof cures (hardens) to an insoluble, infusible state. This is a discovery of great practical significance. It makes possible the production of molding compositions of uniform curing characteristics, which compositions yield molded articles free from imperfections, such as blisters, discoloration, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfact articles that must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In producing my new condensation products, which may be described more particularly as co-condensation or inter-condensation products, the choice of the aldehyde component is dependent largely upon economic considerations and the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde butyraldehyde, acrolein, methacrolein, crotonaldehyde, benzaldehyde, furfural, etc., mixtures thereof, or mixtures of formaldehyde (or compounds engendering formaldehyde) with such aldehydes.

The amido, imido, amino or imino component may be, for instance, urea, thiourea, diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylol urea, methylene urea, guanidine, dicyandiamide, guanyl urea, guanyl thiourea, biguanide, aminotriazines, aminodiazoles, creatinine, guanoline, etc. In many cases the use of an aminotriazine, e. g., melamine, alone or in conjunction with other amido, imido, amino or imino compounds, is particularly advantageous. Illustrative examples of aminotriazines are triazines containing at least one amino group, e. g., melamine, ammeline, ammelide, formoguanamine, 2-amino-1,3,5-triazine and their substitution products, etc. Derivatives of melamine also may be employed, e. g., 2,4,6-trihydrazino-1,3,5-triazine, melam, melem, melon, 2,4,6-triethyltriamino-1,3,5-triazine, 2,4,6-triphenyltriamino-1,3,5-triazine, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (for example, 2-methyl-4-amino-6-hydroxy-1,3,5-triazine, etc.), 2-aryl-4-amino-6-hydroxy-1,3,5-triazines (for example, 2-phenyl-4-amino-6-hydroxy-1,3,5-triazine, etc.), and the like. Suitable mixtures of, for example, amino compounds, imino compounds, amido compounds, imido compounds, or amino and amido compounds, imino and amido compounds, amino and imino compounds, etc., such as above-mentioned by way of illustration, may be employed. All of these compounds are aldehyde-reactable organic compounds and all contain at least one reactive amino, amido, imino or imido group. The term "amidogen compound" as used generally herein is intended to include within its meaning such organic compounds containing at least one active

group.

In producing these new compositions comprising a condensation product of a plurality of compounds including an amidogen compound, an aldehyde and sulfamic acid, the initial condensation may be carried out at normal or at elevated temperatures and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkaline material such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.)

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may add the sulfamic acid to a partial condensation product of an amidogen compound and an aldehyde and effect further condensation between the components. Or, I may first condense the sulfamic acid with an aldehyde, add the resulting product to a partial condensation product of an amidogen compound and an aldehyde and then cause the reaction to proceed further. Or, I may condense or partially condense the sulfamic acid with an excess of aldehyde, add an amidogen compound to this condensation product and effect further condensation between the components. Or, I may separately partially condense (1) an amidogen compound and an aldehyde and (2) sulfamic acid and an aldehyde, thereafter mixing the two products of partial condensation and effecting further condensation therebetween. Still other ways may be employed in combining the components and in producing the unmodified and modified condensation products of this invention, as will be readily understood by those skilled in the art as the description of the invention proceeds. These condensation reactions may proceed under a variety of time, temperature and pressure conditions. The temperature of the reaction may vary from room temperature to the reflux temperature of the reactants at reduced, atmospheric or superatmospheric pressures.

The products obtained as described above properly may be designated as intermediate condensation products. They are thermosetting resinous bodies which alone or mixed with fillers, pigments, dyes, lubricants, etc., may be used, for example, as molding compositions. The modified and unmodified resinous masses are selfconvertible at elevated temperatures to an insoluble, infusible (that is, cured) state.

These intermediate condensation products may be concentrated or diluted further by the addition or removal of volatile solvents to form liquid coating compositions of adjusted viscosity and concentration. The liquid products may be used, for instance, as surface-coating materials, in the production of paints, varnishes, lacquers, enamels, etc., for general adhesive applications, in the production of laminated articles and for numerous other purposes. The liquid intermediate condensation products may be used directly as casting resins. Those intermediate products of a gel-like nature may be dried and granulated to form clear, unfilled, heat-convertible resins.

In order that those skilled in the art better may understand how the present invention may be carried into effect, the following illustrative examples thereof are given. All parts are by weight.

Example 1

|  | Parts |
|---|---|
| Melamine | 630.0 |
| Aqueous solution of formaldehyde (approx. 37.1% HCHO) | 1400.0 |
| Aqueous ammonia (28% NH₃) | 30.0 |
| Sodium hydroxide in 150 parts water | 0.6 |
| Sulfamic acid | 1.0 |

All of the above components with the exception of the sulfamic acid were mixed and heated at boiling temperature under reflux for 10 minutes. At the end of this time the stated amount of sulfamic acid was added and the mixture was brought to boiling. The resulting syrup was mixed hot with 670 parts alpha cellulose in flock form and 4 parts of a mold lubricant, specifically zinc stearate. The wet compound was air dried at room temperature, after which it was molded for 3 minutes at 130° C. under a pressure of 2,000 pounds per square inch. The molded pieces did not become distorted when pulled hot from the mold. The molded articles were well cured throughout and had excellent gloss and color. When sulfamic acid is omitted from the above formulation, uncured articles which readily disintegrate in water are obtained.

Example 2

|  | Parts |
|---|---|
| Urea | 570.0 |
| Aqueous solution of formaldehyde (approx. 37.1% HCHO) | 1610.0 |
| Diethyl malonate | 80.0 |
| Aqueous ammonia (28% NH₃) | 76.0 |
| Sodium hydroxide in 100 parts water | 0.4 |
| Sulfamic acid | 1.0 |

All of the above components with the exception of the sulfamic acid were mixed and heated at boiling temperature under reflux for 30 minutes. At the end of this period the stated amount of sulfamic acid was added, the mixture was brought to boiling, and thereafter cooled. The resulting resin syrup was mixed with 700 parts alpha cellulose in flock form and 4 parts zinc stearate to form a molding (moldable) compound. The wet compound was dried for 2¾ hours at 70° C. The dried compound was molded for 3 minutes at 130° C. under a pressure of 2,000 pounds per square inch. The molded pieces were pulled hot from the mold. They were well cured throughout and showed evidence of good plastic flow of the molding compound during molding.

Example 3

|  | Parts |
|---|---|
| Urea | 570.0 |
| Aqueous solution of formaldehyde (approx. 37.1% HCHO) | 1610.0 |
| Ethyl acetoacetate | 55.0 |
| Aqueous ammonia (28% NH₃) | 60.0 |
| Sodium hydroxide in 100 parts water | 0.4 |
| Sulfamic acid | 2.0 |

Exactly the same procedure was followed in making the resin syrup and the molding compound as described under Example 2 with the exception that the wet compound was dried for 2½ hours at 70° C. and the molding time was only two minutes. Well-cured products were obtained.

Example 4

|  | Parts |
|---|---|
| Melamine | 315.0 |
| Urea | 150.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Sulfamic acid | 0.95 |

All of the above components with the exception of the sulfamic acid were heated at boiling temperature under reflux for 15 minutes. The sulfamic acid was then added and the mass was brought to boiling. The hot resin syrup was mixed with 475 parts alpha cellulose in flock form and 4 parts zinc stearate to form a molding compound. The wet compound was dried for 1½ hours at 75° C. Well-cured molded articles were obtained by molding the dried compound for 2 minutes at 130° C. under a pressure of 2,000 pounds per square inch.

Example 5

|  | Parts |
|---|---|
| Melamine | 315.0 |
| Thiourea | 190.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Sulfamic acid | 0.98 |

Same procedure was followed in making the resin syrup as described under Example 4. The hot resin syrup was mixed with 490 parts alpha cellulose in flock form and 4 parts zinc stearate. The wet compound was dried for 2¾ hours at 75° C. The dried compound was molded for 2 minutes at 130° C. under a pressure of 2,000 pounds per square inch. The molded articles were well cured throughout and had excellent water resistance.

Example 6

|  | Parts |
|---|---|
| Melamine | 472.5 |
| Dicyandiamide | 105.0 |
| Aqueous solution of formaldehyde (approx. 37.1% HCHO) | 1200.0 |
| Aqueous ammonia (28% NH₃) | 30.0 |
| Sodium hydroxide in 30 parts water | 0.6 |
| Sulfamic acid | 2.0 |

Same procedure was followed in making the resin syrup as described under Example 4. The hot syrup was mixed with 610 parts alpha cellulose in flock form and 4 parts zinc stearate. The wet compound was air dried at room temperature. The dried compound was molded for 5 minutes at 140° C. under a pressure of 2,000 pounds per square inch, yielding well-cured molded articles.

Example 7

| | Parts |
|---|---|
| Melamine | 1200.0 |
| Aqueous solution of formaldehyde (approx. 37.1% HCHO) | 2800.0 |
| Ethyl acetoacetate | 65.0 |
| Aqueous ammonia (28% NH$_3$) | 60.0 |
| Sodium hydroxide in 200 parts water | 1.6 |
| Sulfamic acid | 6.0 |

Same procedure was followed in making the resin syrup as described under Example 1. The hot resin syrup was mixed with 1330 parts alpha cellulose in flock form and 8 parts zinc stearate to form a molding compound. The wet compound was dried at 67° C. for 2½ hours. Well-cured molded articles were obtained by molding the dried compound for 2 minutes at 130° C. under a pressure of 2,000 pounds per square inch.

Example 8

| | Parts |
|---|---|
| Melamine | 1132.0 |
| Aqueous solution of formaldehyde (approx. 37.1% HCHO) | 2800.0 |
| Diethyl malonate | 216.0 |
| Aqueous ammonia (28% NH$_3$) | 60.0 |
| Sodium hydroxide in 120 parts water | 1.2 |
| Sulfamic acid | 6.0 |

Same procedure was followed in making the resin syrup as described under Example 4. Molding compounds and molded articles were made as described under Example 7 with the exception that the time of drying the wet compound at 67° C. was 65 hours. The molded pieces were pulled hot from the mold. They were well cured throughout and gave indications of good plastic flow of the molding compound during molding.

The ratio of the reactants to each other may be considerably varied but, in general, it is desirable to use at least one mol of aldehyde for each mol of mixed (total) amidogen compound and sulfamic acid. Good results are obtained by using at least 1½ mols (e. g., from 1¾ to 5 or 6 mols or more) of an aldehyde, specifically formaldehyde, for each mol of total amidogen compound and sulfamic acid. Approximately two to three mols of aldehyde per mol total amidogen compound and sulfamic acid usually give very satisfactory results, particularly from the viewpoint of optimum yield of condensation product per unit cost.

The proportion of the sulfamic acid may be widely varied as desired or as conditions may require, but in most cases is within the range of 0.001 to 0.2 mol sulfamic acid per mol amidogen compound. Not exceeding substantially 0.1 mol of sulfamic acid per mol of amidogen compound often is used. Thus, excellent heat-convertible molding compositions are produced by suitably incorporating a filler into a soluble, fusible resinous condensation product of a mixture comprising a total of 1 mol of urea and another amidogen compound, e. g., an aminotriazine such as melamine, at least 1½ mols, advantageously 1¾ to 2½ or 3 mols of an aldehyde, e. g., formaldehyde, and not exceeding substantially 0.1 mol of sulfamic acid. In general, the amount of sulfamic acid is chosen so that a heat-convertible resin of the desired curing rate is obtained.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acryloamide, benzamide, toluene sulfonamide, benzene disulfonamide, benzene trisulfonamide, adipic diamide, phthalamide, etc.; amines such as ethylene diamine, aniline, phenylene diamine, etc.; phenols; aminophenols; ketones; etc.

The modifying bodies also may take the form of high molecular weight bodies with or without resinous characteristics, for example hydrolyzed wood products, formalized cellulose derivatives, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc.; polyvinyl compounds such as polyvinyl alcohol, polyvinyl acetate, polyvinyl acetals, specifically polyvinyl formal, synthetic linear condensation products such as the superpolyamides, etc.

Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a wide variety of shapes under heat and pressure, more particularly at temperatures of the order of 100° to 200° C. For optimum results, I prefer to use temperatures ranging from approximately 120° to 180° C. Molding pressures may be varied considerably, but usually are within the range of 1,000 to 10,000 pounds per square inch, more particularly from 2,000 to 4,000 and 5,000 pounds per square inch.

From the foregoing description it will be seen that the present invention provides new and useful compositions of matter comprising an aminoplast, specifically a heat-curable aminoplast, modified with sulfamic acid. The scope of the invention also includes products comprising an aminoplast cured to an insoluble and infusible state with sulfamic acid. The invention also provides compositions comprising sulfamic acid and a soluble, fusible aminoplast. Specific embodiments of the invention include the reaction product of ingredients comprising an amidogen compound, e. g., an aminotriazine, and aldehyde and sulfamic acid; also, heat-curable compositions comprising a potentially reactive condensation product of, for example, a mixture comprising urea, formaldehyde and sulfamic acid, or a mixture comprising an aminotriazine (e. g., melamine), formaldehyde and sulfamic acid, or a mixture comprising urea, an aminotriazine, formaldehyde and sulfamic acid, including the products obtained by curing such heat-curable compositions. The invention further provides thermosetting molding compositions comprising a filler and a heat-curable aminoplast internally modified with sulfamic acid, as well as articles of manufacture comprising such heat-hardened molding compositions. Also included within the scope of the invention is a method of preparing new condensation products which comprises effecting reaction between ingredients comprising an amidogen compound, specifically an aminotriazine, an aldehyde and sulfamic acid. A specific method feature of the invention is the method which comprises effecting partial reaction between ingredients comprising, for example, urea, melamine and formaldehyde in the presence of a condensation catalyst comprising ammonia and a fixed alkali, adding a small amount of sulfamic acid to the resulting partial condensation product and causing the sulfamic acid to intercondense with the said partial condensation product.

The modified or unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the manufacture of arc-extinguishing tubes capable of evolving an arc-extinguishing gas under the heat of the arc, in the production of wire or baking enamels, and for bonding or cementing mica flakes to make a laminated mica article. They are particularly useful as fire retardants and sizings for cotton, linen and other cellulosic materials. They also may be used as impregnants for electrical coils. The cured products have excellent resistance to heat and water and have a high dielectric strangth. Products of outstanding heat, water and arc resistance are obtained when an aminotriazine constitutes one of the reactants. Such products are especially suitable for electrically insulating and other uses where this combination of properties is especially desirable.

What I claim as new and desire to secure by Letters Patent of the United States is:

1. A composition of matter comprising the resinous reaction product of ingredients comprising an aminotriazine, an aldehyde and sulfamic acid.

2. A composition of matter comprising the resinous reaction product of (1) a partial condensation product of ingredients comprising an aminotriazine and formaldehyde and (2) sulfamic acid in an amount corresponding to from 0.001 to 0.2 mol sulfamic acid per mol of the aminotriazine component of the partial condensation product of (1).

3. A resinous composition comprising the product of reaction of ingredients comprising the following components in the stated molar ratios: 1 mol of an aminotriazine, from 0.001 to 0.2 mol sulfamic acid and an aldehyde in an amount corresponding to at least 1½ mols aldehyde per mol of the sum of the aminotriazine and sulfamic acid components.

4. A composition comprising the resinous reaction product of (1) a partial condensation product obtained by reaction of ingredients comprisng urea, melamine and formaldehyde while admixed with a condensation catalyst comprising ammonia and a fixed alkali, and (2) an amount of sulfamic acid corresponding to from 0.001 to 0.2 mol sulfamic acid per mol of the sum of the urea and melamine ingredients of the said partial condensation product.

5. The reaction product of ingredients comprising melamine, an aldehyde and sulfamic acid.

6. A heat-curable composition comprising a potentially reactive condensation product of a mixture comprising urea, melamine, formaldehyde and sulfamic acid.

7. A product comprising the cured composition of claim 6.

8. A heat-curable composition comprising a potentially reactive condensation product of a mixture comprising an aminotriazine, formaldehyde and sulfamic acid.

9. A product comprising the cured composition of claim 8.

10. A heat-curable composition comprising a potentially reactive condensation product of a mixture comprising melamine, formaldehyde and sulfamic acid.

11. A product comprising the cured composition of claim 10.

12. A heat-curable composition comprising a potentially reactive condensation product of a mixture comprising urea, an aminotriazine, formaldehyde and sulfamic acid.

13. A product comprising the cured composition of claim 12.

14. A thermosetting molding composition comprising a filler and a heat-curable aminotriazine-formaldehyde partial condensation product internally modified with sulfamic acid.

15. An article of manufacture comprising the heat-hardened molding composition of claim 14.

16. The method of preparing new condensation products which comprises effecting reaction between ingredients comprising a urea, an aminotriazine, an aldehyde and sulfamic acid.

17. The method which comprises effecting partial reaction between ingredients comprising urea, melamine and formaldehyde in the presence of a condensation catalyst comprising ammonia and a fixed alkali, adding sulfamic acid to the resulting partial condensation product in an amount corresponding to from 0.001 to 0.2 mol sulfamic acid per mol of the sum of the said urea and melamine ingredients, and causing the sulfamic acid to intercondense with the said partial condensation product.

18. The method which comprises effecting partial reaction between ingredients comprising an aminotriazine and an aldehyde under alkaline conditions, adding a small amount of sulfamic acid to the resulting partial condensation product and causing the sulfamic acid to intercondense with the said partial condensation product.

19. The method which comprises bringing into contact at reaction temperature ingredients including (1) the product of partial reaction of ingredients including an aminotriazine and formaldehyde and (2) sulfamic acid in an amount corresponding to from 0.001 to 0.2 mol sulfamic acid per mol of the aminotriazine of (1).

20. A composition containing the resinous product of reaction of ingredients including (1) the product of partial reaction under alkaline conditions of ingredients including melamine and formaldehyde and (2) sulfamic acid in an amount corresponding to from 0.001 to 0.2 mol sulfamic acid per mol of the melamine of (1).

21. The method which comprises bringing into contact at reaction temperature ingredients including (1) sulfamic acid and (2) a product of partial reaction under alkaline conditions of ingredients including an aminotriazine and an aldehyde.

22. The method which comprises bringing into contact at reaction temperature ingredients including (1) sulfamic acid and (2) a product of partial reaction under alkaline conditions of ingredients including melamine and formaldehyde.

23. The product obtained by bringing into contact at reaction temperature ingredients including (1) sulfamic acid and (2) a product of partial reaction under alkaline conditions of ingredients including an aminotriazine and an aldehyde.

24. The product obtained by bringing into contact at reaction temperature ingredients including (1) sulfamic acid and (2) a product of partial reaction under alkaline conditions of ingredients including melamine and formaldehyde.

GAETANO F. D'ALELIO.

CERTIFICATE OF CORRECTION.

Patent No. 2,377,867.   June 12, 1945.

GAETANO F. D'ALELIO.

It is hereby certified that error appears in the printed specification of the above numbered patent requiring correction as follows: Page 1, second column, line 15, for "reactanct" read --reactant--; line 28, for "imperfact" read --imperfect--; page 2, second column, line 31, after "etc.)" insert a period; page 4, second column, line 6, for "acryloamide" read --acrylamide--; line 47, for "and" read --or--; lines 64 and 65, strike out the words "urea, formaldehyde and sulfamic acid, or a mixture comprising"; page 5, first column, line 35, for "strangth" read --strength--; and that the said Letters Patent should be read with this correction therein that the same may conform to the record of the case in the Patent Office.

Signed and sealed this 11th day of September, A. D. 1945.

Leslie Frazer (Seal)   First Assistant Commissioner of Patents.

contact at reaction temperature ingredients including (1) sulfamic acid and (2) a product of partial reaction under alkaline conditions of ingredients including melamine and formaldehyde.

23. The product obtained by bringing into contact at reaction temperature ingredients including (1) sulfamic acid and (2) a product of partial reaction under alkaline conditions of ingredients including an aminotriazine and an aldehyde.

24. The product obtained by bringing into contact at reaction temperature ingredients including (1) sulfamic acid and (2) a product of partial reaction under alkaline conditions of ingredients including melamine and formaldehyde.

GAETANO F. D'ALELIO.

CERTIFICATE OF CORRECTION.

Patent No. 2,377,867.   June 12, 1945.

GAETANO F. D'ALELIO.

It is hereby certified that error appears in the printed specification of the above numbered patent requiring correction as follows: Page 1, second column, line 15, for "reactanct" read --reactant--; line 28, for "imperfact" read --imperfect--; page 2, second column, line 31, after "etc.)" insert a period; page 4, second column, line 6, for "acryloamide" read --acrylamide--; line 47, for "and" read --or--; lines 64 and 65, strike out the words "urea, formaldehyde and sulfamic acid, or a mixture comprising"; page 5, first column, line 35, for "strangth" read --strength--; and that the said Letters Patent should be read with this correction therein that the same may conform to the record of the case in the Patent Office.

Signed and sealed this 11th day of September, A. D. 1945.

Leslie Frazer (Seal)   First Assistant Commissioner of Patents.